(12) United States Patent
Xie

(10) Patent No.: US 7,021,175 B1
(45) Date of Patent: Apr. 4, 2006

(54) RACING TYPE PEDAL FOR BICYCLE

(76) Inventor: Jin-Long Xie, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/900,631

(22) Filed: Jul. 29, 2004

(51) Int. Cl.
*G05G 1/14* (2006.01)
*B62M 3/08* (2006.01)

(52) U.S. Cl. ..................... 74/594.6; 74/594.4
(58) Field of Classification Search ............. 74/594.4, 74/594.6; 36/131; B62M 3/08
See application file for complete search history.

(56) References Cited

U.S. PATENT DOCUMENTS

| | | | | |
|---|---|---|---|---|
| 5,060,537 A | * | 10/1991 | Nagano | 74/594.6 |
| 6,085,614 A | * | 7/2000 | Lin | 74/594.6 |
| 6,112,620 A | * | 9/2000 | Chen | 74/594.6 |
| 6,282,984 B1 | * | 9/2001 | Chen | 74/594.6 |
| 2003/0159538 A1 | * | 8/2003 | Muraoka et al. | 74/594.6 |
| 2004/0187636 A1 | * | 9/2004 | Hsiao et al. | 74/594.6 |

FOREIGN PATENT DOCUMENTS

EP   000466075 A1 * 1/1992

\* cited by examiner

*Primary Examiner*—Vinh T. Luong
(74) *Attorney, Agent, or Firm*—Alan D. Kamrath; Nikolai & Mersereau, P.A.

(57) ABSTRACT

A racing type pedal includes a main body, a pivot hook, a limit member, an adjusting bolt, a press block, and two torsion springs. Thus, the movement of the adjusting bolt is limited by the limit member, and the movement of the press block is limited by the torsion springs, so that the adjusting bolt and the press block form a linear movement without deflection, thereby producing an evenly distributed shearing stress between the adjusting bolt and the press block, thereby preventing the adjusting bolt and the press block from being worn out due to an uneven shearing stress.

8 Claims, 11 Drawing Sheets

RACING TYPE PEDAL FOR BICYCLE

BACKGROUND OF THE INVENTION

1. Field of the Invention

The present invention relates to a racing type pedal, and more particularly to a racing type pedal for a bicycle.

2. Description of the Related Art

In general, the racing type pedal for a bicycle includes a road-use pedal and a mountaineering pedal, and the two different types of pedals need to mate with two different types of shoes and snap blocks. In practice, the snap block is mounted on the bottom of the bicycle shoe and snapped onto the bicycle pedal to secure the bicycle shoe on the bicycle pedal.

A conventional racing type pedal 3 in accordance with the prior art shown in FIGS. 10 and 11 comprises a main body 30, a hollow pivot hook 31 pivotally mounted on the main body 30 by a pivot shaft 32 and having a side formed with a vertical plate 310 having a through hole 3101, an adjusting bolt 34 mounted on the plate 310 of the pivot hook 31 extended through the through hole 3101 of the plate 310 of the pivot hook 31, a press block 35 mounted on the distal end of the adjusting bolt 34, and two torsion springs 33 each mounted on the pivot shaft 32 and each having a first end 330 urged on a block 301 of the main body 30 and a second end 331 urged on the press block 35.

However, when the adjusting bolt 34 is rotated to move the press block 35 to adjust the torque of the pivot hook 31, the adjusting bolt 34 and the press block 35 are subjected to a shearing force applied by the torsion springs 33, so that the adjusting bolt 34 is easily deflected from the press block 35 during movement, thereby disengaging or wearing the adjusting bolt 34 and the press block 35. In addition, the plate 310 of the pivot hook 31 is subjected to a force applied by the adjusting bolt 34, so that the plate 310 of the pivot hook 31 is easily distorted or deformed due to the applied force during a long-term utilization.

SUMMARY OF THE INVENTION

In accordance with one embodiment of the present invention, there is provided a racing type pedal, comprising:

a main body;

a pivot hook pivotally mounted on the main body by a pivot shaft;

a metallic bushing mounted on the pivot hook and having a first end formed with a mounting tube extended through the pivot hook and directed toward the main body;

an adjusting bolt mounted on the bushing and having a distal end extended through and protruding outward from the mounting tube of the bushing;

a press block mounted on the distal end of the adjusting bolt and located between the main body and the pivot hook; and two torsion springs each mounted on the pivot shaft and each having a first end urged on the main body and a second end urged on the press block.

In accordance with another embodiment of the present invention, there is provided a racing type pedal, comprising:

a main body;

a pivot hook pivotally mounted on the main body by a pivot shaft;

a support plate mounted on the pivot hook and formed with a through hole;

an adjusting bolt mounted on the support plate and having a distal end extended through and protruding outward from the through hole of the support plate;

a limit member mounted on the support plate and rested on the adjusting bolt;

a press block mounted on the distal end of the adjusting bolt and located between the main body and the pivot hook; and two torsion springs each mounted on the pivot shaft and each having a first end urged on the main body and a second end urged on the press block.

The primary objective of the present invention is to provide a racing type pedal having a torque adjustment function and has an evenly distributed shearing stress.

Another objective of the present invention is to provide a racing type pedal, wherein the movement of the adjusting bolt is limited by the mounting tube of the bushing, and the movement of the press block is limited by the torsion springs, so that the adjusting bolt and the press block form a linear movement without deflection, thereby producing an evenly and smoothly distributed shearing stress between the adjusting bolt and the press block, thereby preventing the adjusting bolt and the press block from being worn out due to an uneven shearing stress.

A further objective of the present invention is to provide a racing type pedal, wherein the pivot hook is mounted on the main body easily and conveniently, thereby facilitating a user mounting the racing type pedal.

A further objective of the present invention is to provide a racing type pedal, wherein the adjusting bolt is mounted on the back plate of the pivot hook by the metallic bushing, so that the whole weight of the racing type pedal is reduced.

Further benefits and advantages of the present invention will become apparent after a careful reading of the detailed description with appropriate reference to the accompanying drawings.

DETAILED DESCRIPTION OF THE INVENTION

Figure 1:
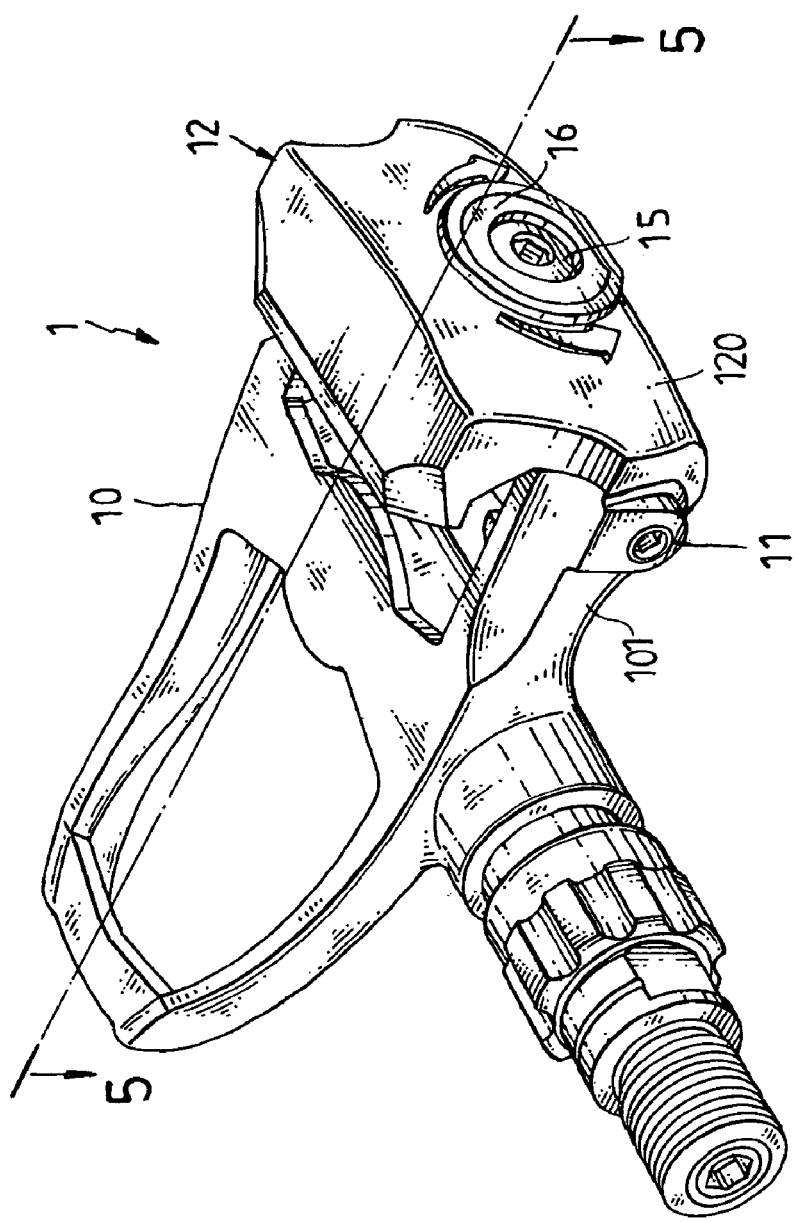
FIG. 1 is a perspective view of a racing type pedal in accordance with the preferred embodiment of the present invention.
Figure 2:
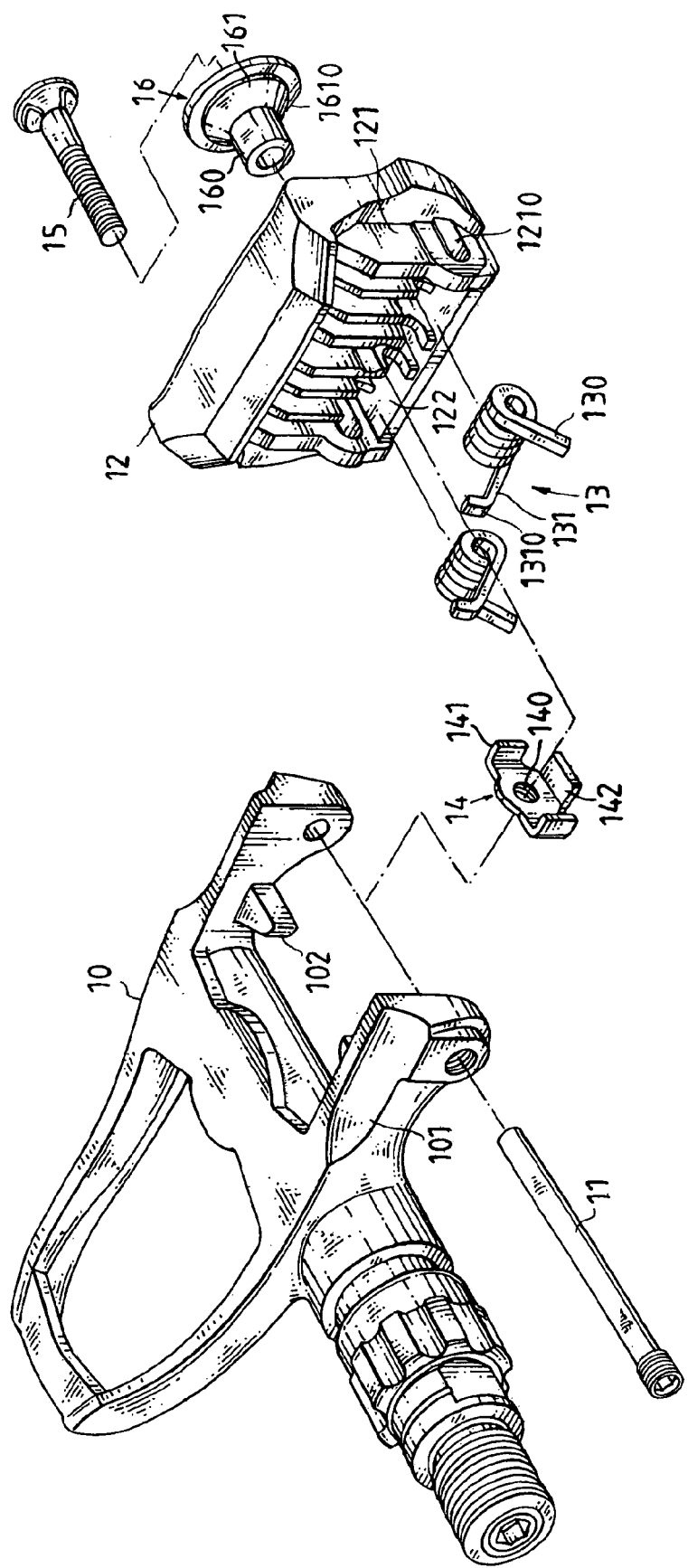
FIG. 2 is an exploded perspective view of the racing type pedal as shown in FIG. 1.
Figure 3:
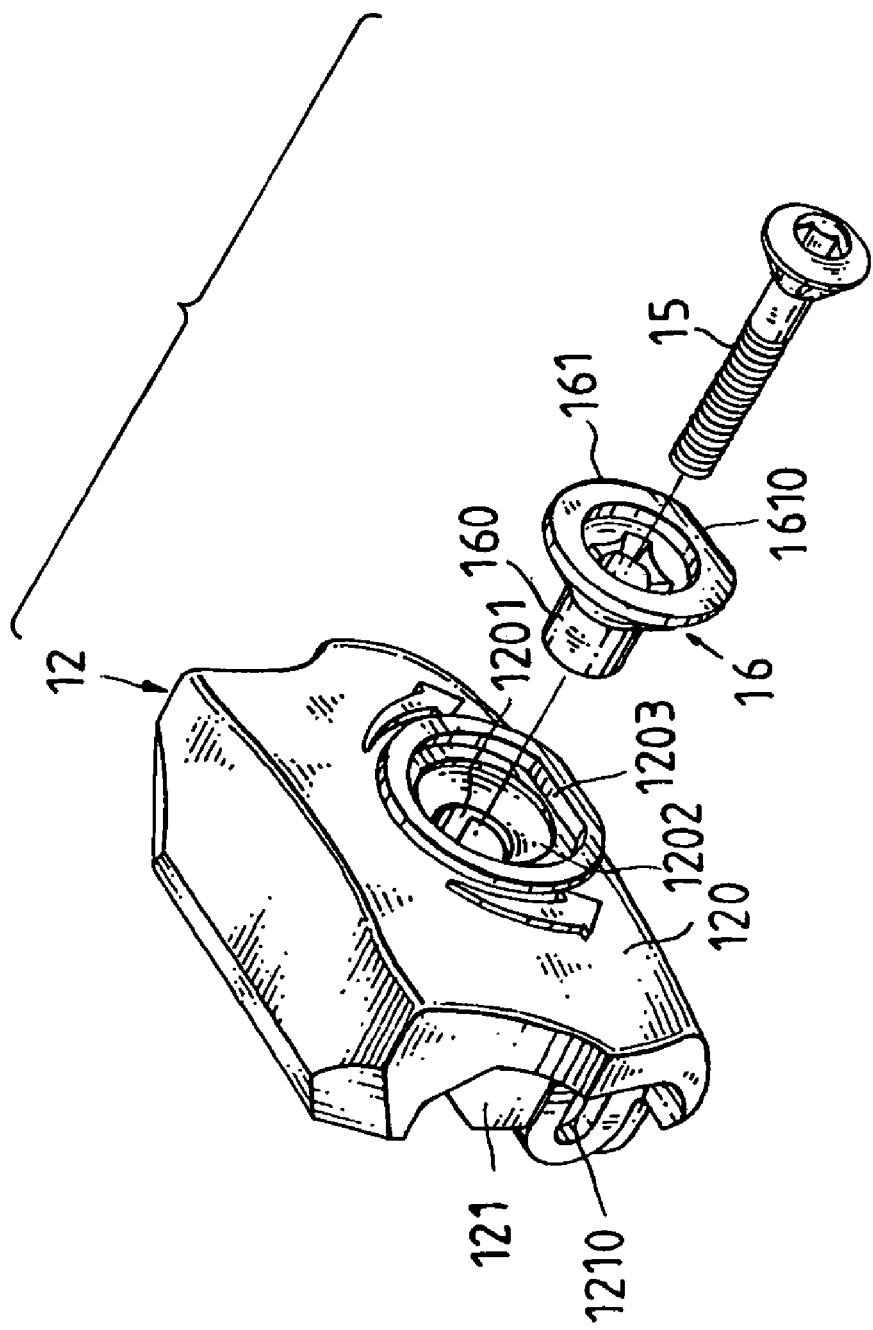
FIG. 3 is a partially exploded perspective view of the racing type pedal as shown in FIG. 1.
Figure 4:
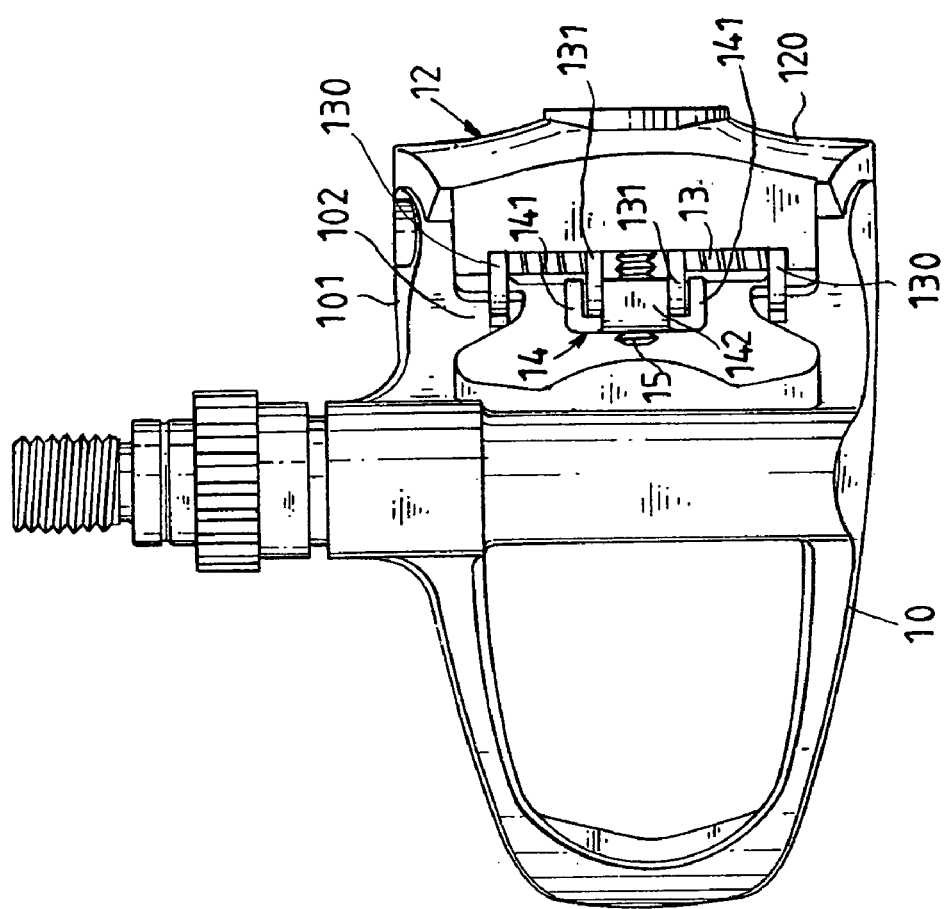
FIG. 4 is a bottom plan view of the racing type pedal as shown in FIG. 1.
Figure 5:
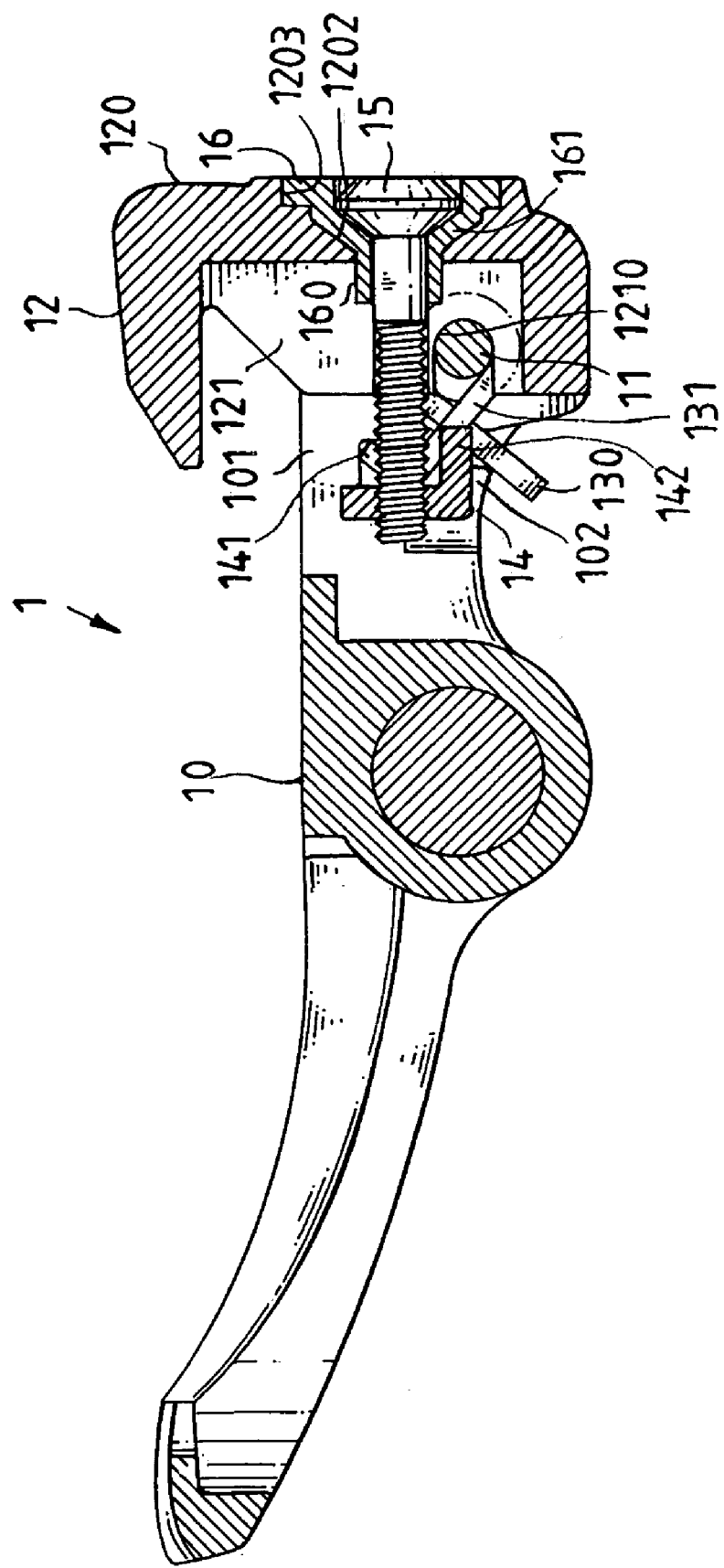
FIG. 5 is a plan cross-sectional view of the racing type pedal taken along line 5—5 as shown in FIG. 1.
Figure 6:
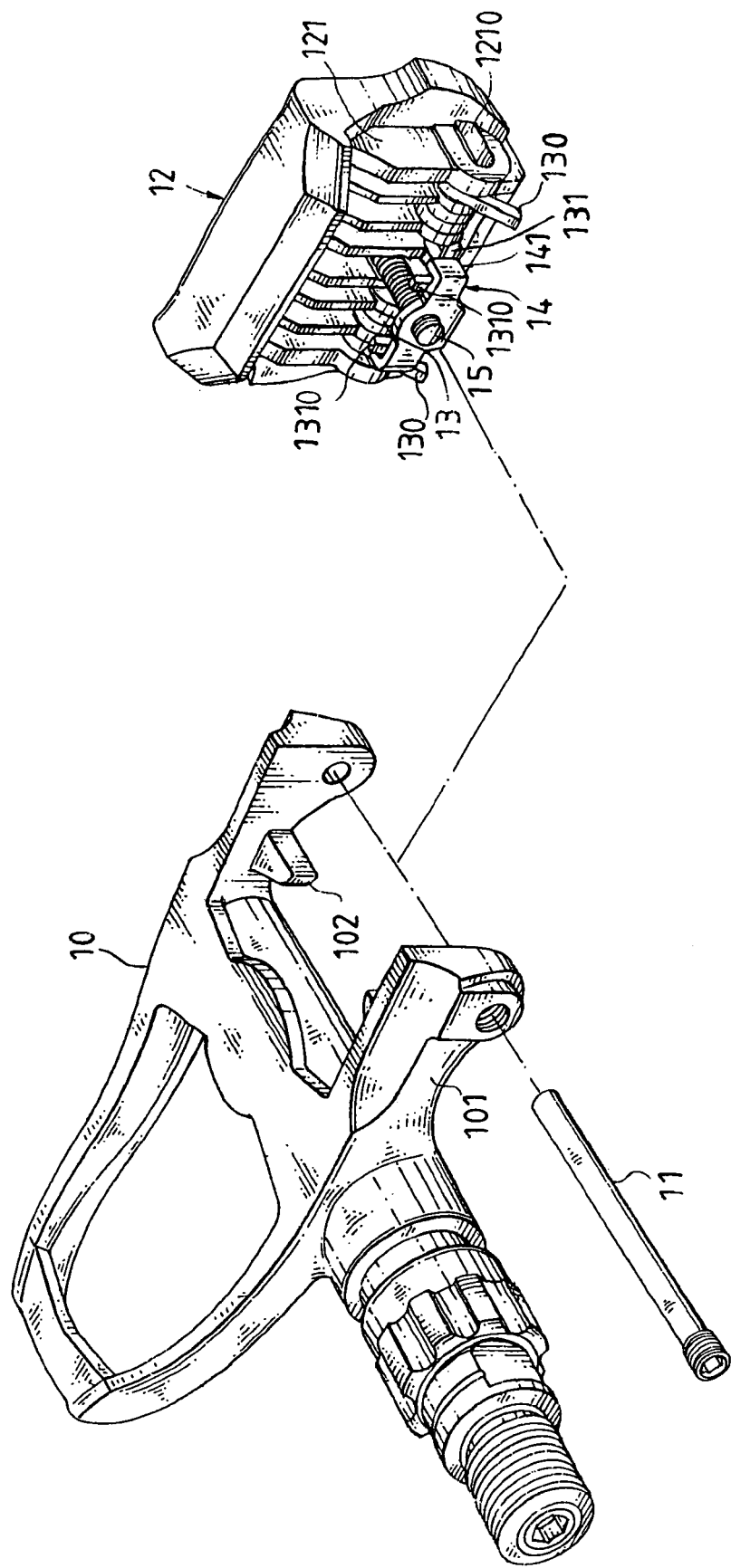
FIG. 6 is a partially exploded perspective view of the racing type pedal as shown in FIG. 1.

Referring to the drawings and initially to FIGS. 1–6, a racing type pedal 1 in accordance with the preferred embodiment of the present invention comprises a main body 10, a pivot hook 12 pivotally mounted on the main body 10 by a pivot shaft 11, a metallic bushing 16 mounted on the pivot hook 12 and having a first end formed with a mounting tube 160 extended through the pivot hook 12 and directed toward the main body 10, an adjusting bolt 15 mounted on the bushing 16 and having a distal end extended through and protruding outward from the mounting tube 160 of the bushing 16, a press block 14 mounted on the distal end of the adjusting bolt 15 and located between the main body 10 and the pivot hook 12, and two torsion springs 13 each mounted on the pivot shaft 11 and each having a first end 130 urged on the main body 10 and a second end 131 urged on the press block 14.

The main body 10 has a forked end formed with two spaced posts 101 each formed with a catch block 102 urged on the first end 130 of the respective torsion spring 13.

The pivot hook 12 has a back plate 120 having an inside formed with a through hole 1201 mounted on the mounting tube 160 of the bushing 16. The through hole 1201 of the back plate 120 of the pivot hook 12 has a side formed with a tapered opening 1202 having a periphery formed with a flattened edge 1203. The pivot hook 12 has two side plates 121 each formed with a pivot hole 1210 pivotally mounted on the pivot shaft 11. The pivot hook 12 has an inside formed with two recesses 122 to receive the torsion springs 13.

The bushing 16 has a second end formed with a tapered head 161 mounted in the tapered opening 1202 of the back plate 120 of the pivot hook 12. The tapered head 161 of the bushing 16 has a periphery formed with a flattened face 1610 rested on the flattened edge 1203 of the tapered opening 1202 of the back plate 120 of the pivot hook 12. Preferably, the pivot hook 12 is integrally formed with the bushing 16.

The press block 14 has a center formed with a screw bore 140 screwed onto the distal end of the adjusting bolt 15. The press block 14 has two ends each formed with a bent first limit plate 141 rested on the second end 131 of the respective torsion spring 13 and has an edge formed with a bent second limit plate 142 rested on the second end 131 of each of the torsion springs 13, so that the torsion springs 13 form a double limit effect on the press block 14.

The second end 131 of each of the torsion springs 13 has a distal end formed with a bent abutment 1310 rested on the press block 14.

In operation, when the adjusting bolt 15 is rotated to move the press block 14 to adjust the torque of the pivot hook 12, movement of the adjusting bolt 15 is limited by the mounting tube 160 of the bushing 16, so that the adjusting bolt 15 performs a linear movement relative to the press block 14. In addition, movement of the press block 14 is limited by the second end 131 of each of the torsion springs 13, so that the press block 14 performs a linear movement without deflection.

Accordingly, the movement of the adjusting bolt 15 is limited by the mounting tube 160 of the bushing 16, and the movement of the press block 14 is limited by the torsion springs 13, so that the adjusting bolt 15 and the press block 14 form a linear movement without deflection, thereby producing an evenly distributed shearing stress between the adjusting bolt 15 and the press block 14, thereby preventing the adjusting bolt 15 and the press block 14 from being worn out due to an uneven shearing stress. In addition, the pivot hook 12 is mounted on the main body 10 easily and conveniently, thereby facilitating a user mounting the racing type pedal. Further, the adjusting bolt 15 is mounted on the back plate 120 of the pivot hook 12 by the metallic bushing 16, so that the whole weight of the racing type pedal is reduced.

Figure 7:
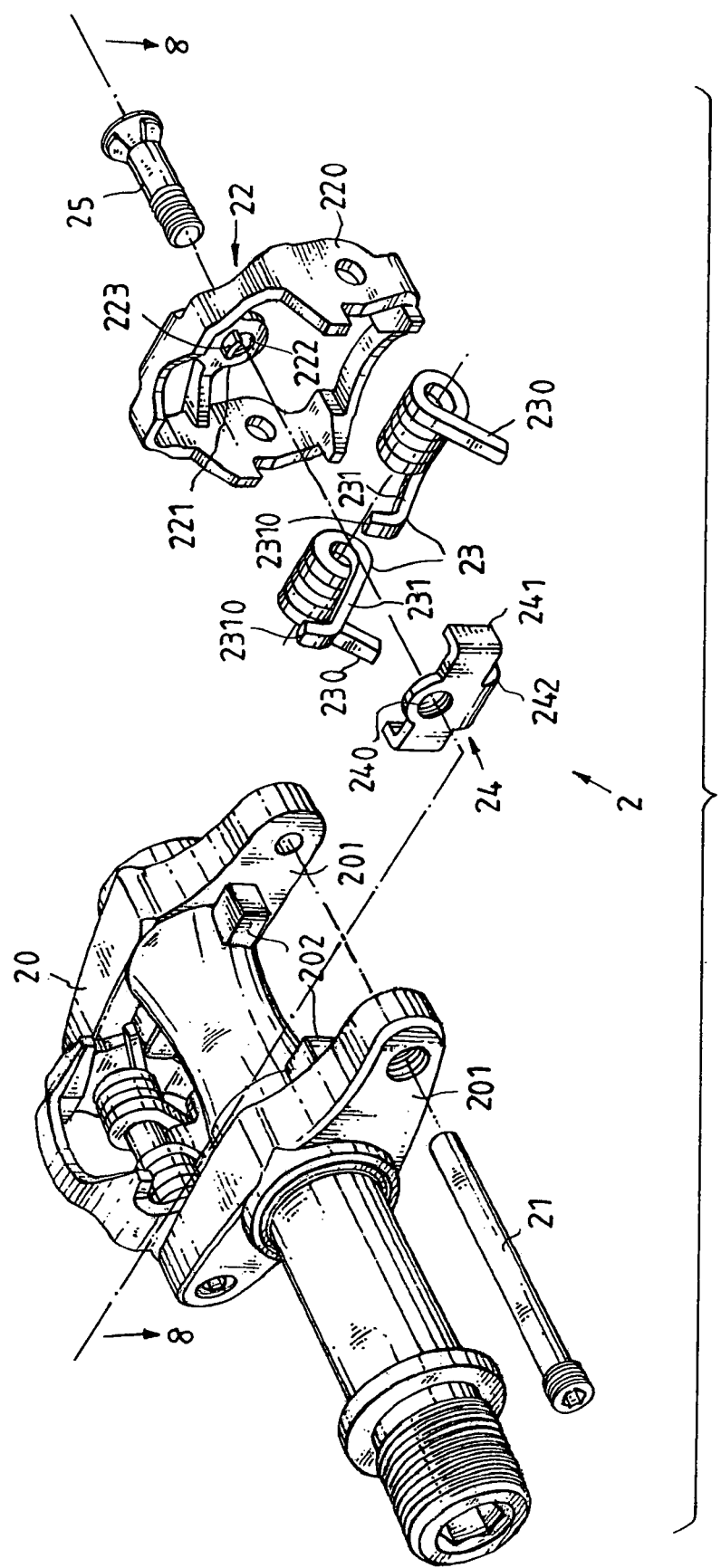
FIG. 7 is an exploded perspective view of a racing type pedal in accordance with another embodiment of the present invention.
Figure 8:
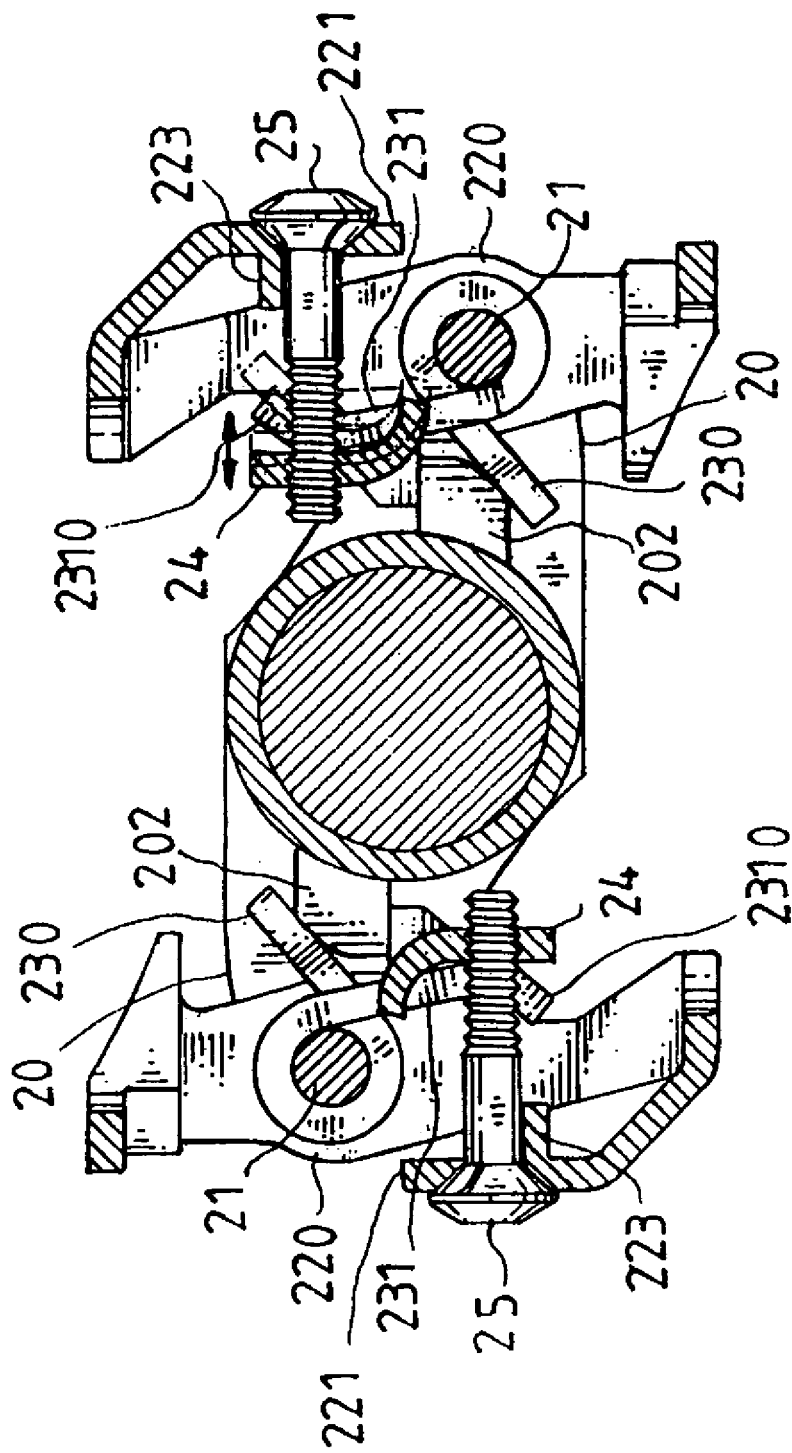
FIG. 8 is a plan cross-sectional assembly view of the racing type pedal taken along line 8—8 as shown in FIG. 7.

Referring to FIGS. 7 and 8, a racing type pedal 2 in accordance with another embodiment of the present invention is available for mountaineering comprises a main body 20, a pivot hook 22 pivotally mounted on the main body 20 by a pivot shaft 21, a support plate 221 mounted on the pivot hook 22 and formed with a through hole 222, an adjusting bolt 25 mounted on the support plate 221 and having a distal end extended through and protruding outward from the through hole 222 of the support plate 221, a limit member 223 mounted on the support plate 221 and rested on the adjusting bolt 25, a press block 24 mounted on the distal end of the adjusting bolt 25 and located between the main body 20 and the pivot hook 22, and two torsion springs 23 each mounted on the pivot shaft 21 and each having a first end 230 urged on the main body 20 and a second end 231 urged on the press block 24.

The main body 20 has a forked end formed with two spaced posts 201 each formed with a catch block 202 urged on the first end 230 of the respective torsion spring 23. The pivot hook 22 is an integrally formed closed frame having a hollow face integrally formed with the support plate 221. The pivot hook 22 has two side plates 220 each pivotally mounted on the pivot shaft 21. Preferably, the limit member 223 is an arc-shaped catch plate integrally protruded outward from a side of the through hole 222 of the support plate 221. The press block 24 has a center formed with a screw bore 240 screwed onto the distal end of the adjusting bolt 25. The press block 24 has two ends each formed with a bent first limit plate 241 rested on the second end 231 of the respective torsion spring 23 and has an edge formed with a bent second limit plate 242 rested on the second end 231 of each of the torsion springs 23, so that the torsion springs 23 form a double limit effect on the press block 24. The second end 231 of each of the torsion springs 23 has a distal end formed with a bent abutment 2310 rested on the press block 24.

In operation, when the adjusting bolt 25 is rotated to move the press block 24 to adjust the torque of the pivot hook 22, movement of the adjusting bolt 25 is limited by the limit member 223, so that the adjusting bolt 25 has a linear movement relative to the press block 24. In addition, movement of the press block 24 is limited by the second end 231 of each of the torsion springs 23, so that the press block 24 has a linear movement without deflection.

Figure 9:
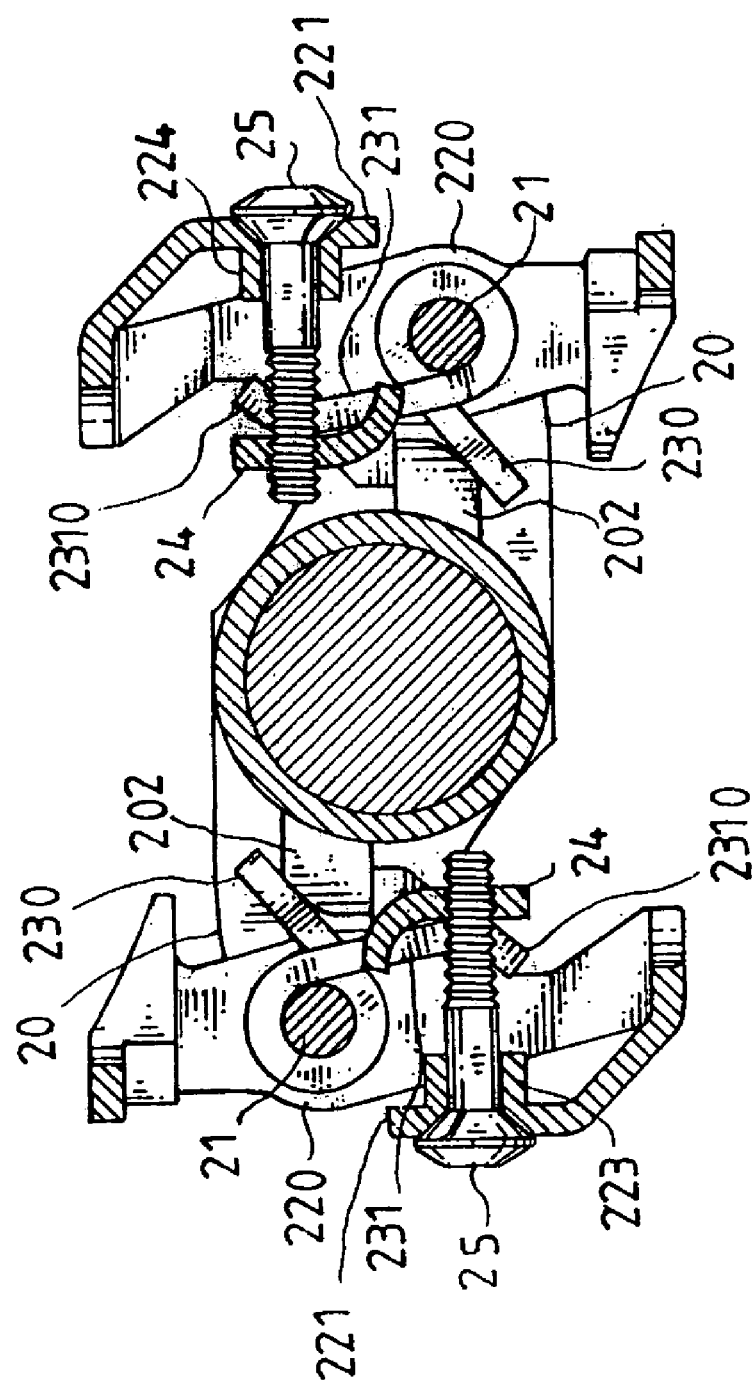
FIG. 9 is a plan cross-sectional assembly view of a racing type pedal in accordance with another a further embodiment of the present invention.
Figure 10:
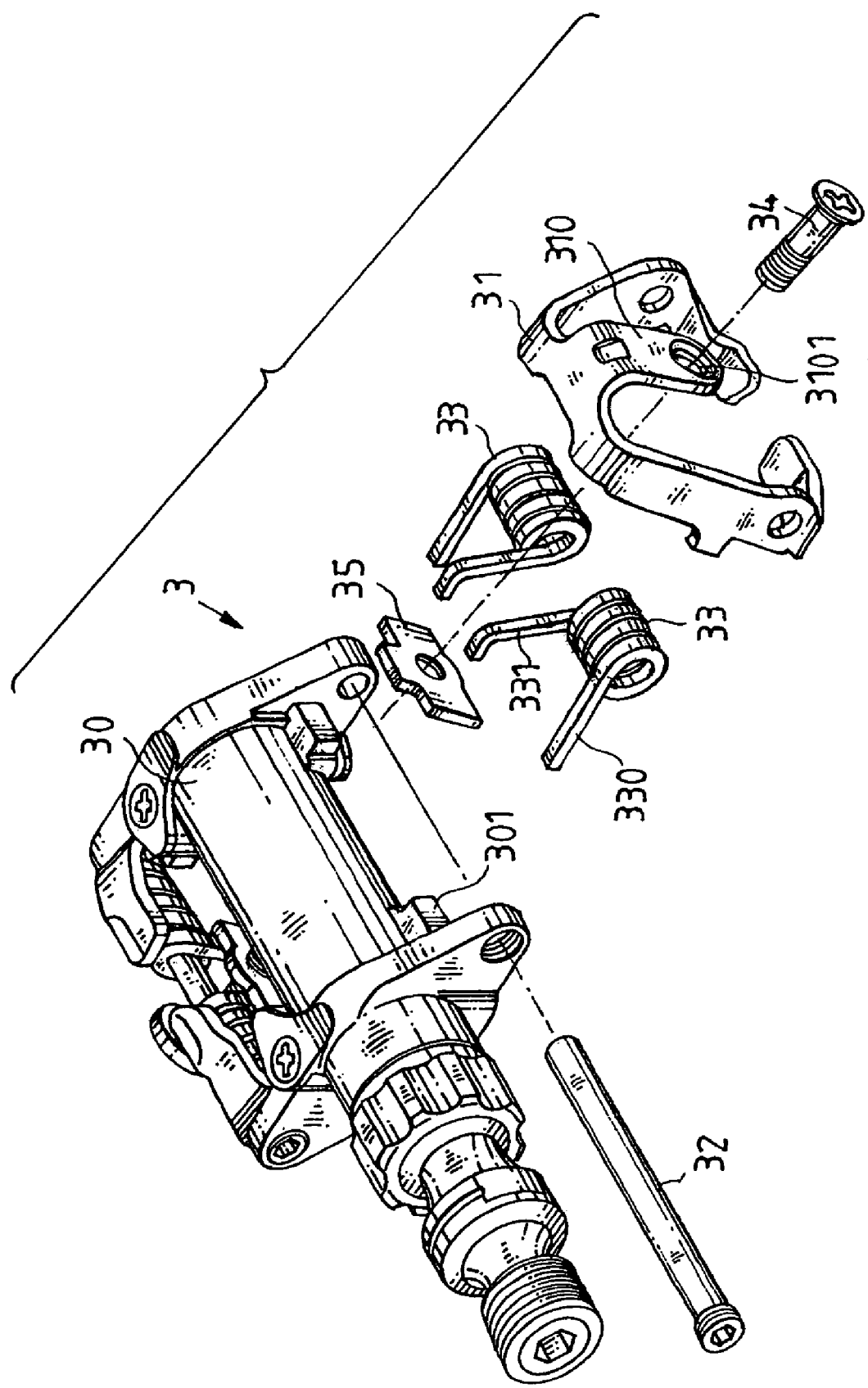
FIG. 10 is an exploded perspective view of a conventional racing type pedal in accordance with the prior art.
Figure 11:
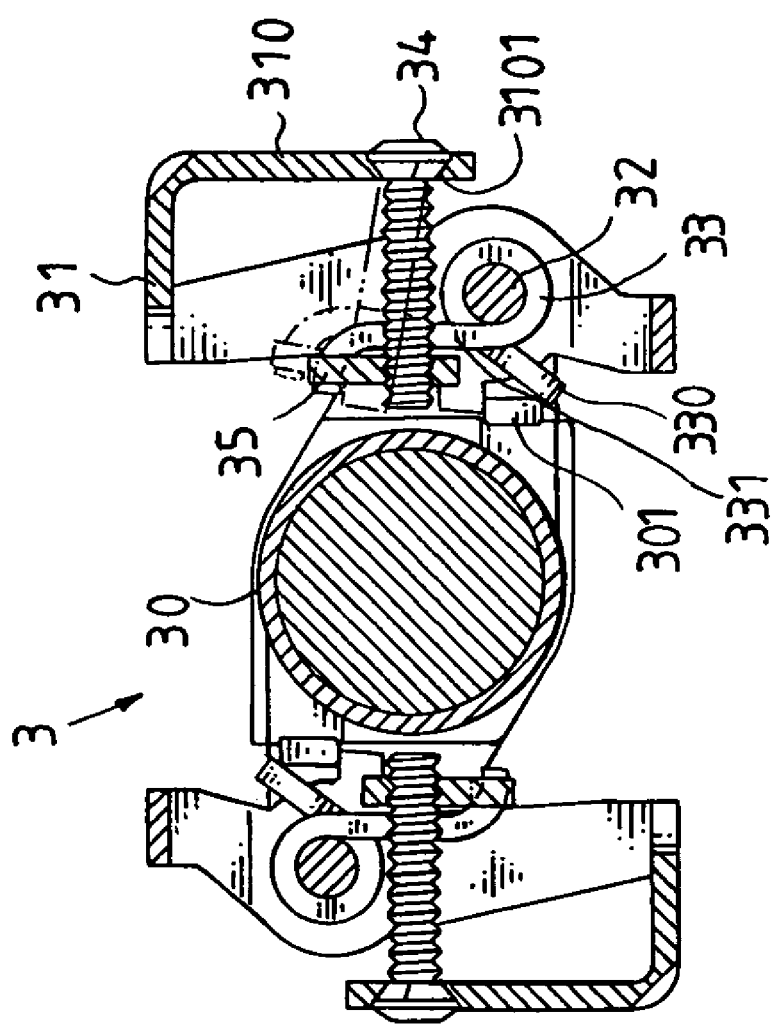
FIG. 11 is a plan cross-sectional assembly view of the conventional racing type pedal as shown in FIG. 10.

Referring to FIG. 9, the limit member is a mounting tube 224.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A racing type pedal, comprising:
 a main body;
 a pivot hook pivotally mounted on the main body by a pivot shaft;

a metallic bushing mounted on the pivot hook and having a first end formed with a mounting tube extended through the pivot hook and directed toward the main body;

an adjusting bolt mounted on the bushing and having a distal end extended through and protruding outward from the mounting tube of the bushing;

a press block mounted on the distal end of the adjusting bolt and located between the main body and the pivot hook; and two torsion springs each mounted on the pivot shaft and each having a first end urged on the main body and a second end urged on the press block;

wherein the pivot hook has a back plate having an inside formed with a through hole mounted on the mounting tube of the bushing;

wherein the through hole of the back plate of the pivot hook has a side formed with a tapered opening having a periphery formed with a flattened edge, and the bushing has a second end formed with a tapered head mounted in the tapered opening of the back plate of the pivot hook and having a periphery formed with a flattened face rested on the flattened edge of the tapered opening of the back plate of the pivot hook.

2. The racing type pedal in accordance with claim 1, wherein the pivot hook is integrally formed with the bushing.

3. The racing type pedal in accordance with claim 1, wherein the second end of each of the torsion springs has a distal end formed with a bent abutment rested on the press block.

4. The racing type pedal in accordance with claim 1, wherein the press block has a center formed with a screw bore screwed onto the distal end of the adjusting bolt.

5. The racing type pedal in accordance with claim 1, wherein the main body has a forked end formed with two spaced posts each formed with a catch block urged on the first end of the respective torsion spring.

6. The racing type pedal in accordance with claim 1, wherein the pivot hook has two side plates each formed with a pivot hole pivotally mounted on the pivot shaft.

7. The racing type pedal in accordance with claim 1, wherein the pivot hook has an inside formed with two recesses to receive the torsion springs.

8. A racing type pedal, comprising:

a main body;

a pivot hook pivotally mounted on the main body by a pivot shaft;

a metallic bushing mounted on the pivot hook and having a first end formed with a mounting tube extended through the pivot hook and directed toward the main body;

an adjusting bolt mounted on the bushing and having a distal end extended through and protruding outward from the mounting tube of the bushing;

a press block mounted on the distal end of the adjusting bolt and located between the main body and the pivot hook; and two torsion springs each mounted on the pivot shaft and each having a first end urged on the main body and a second end urged on the press block;

wherein the press block has two ends each formed with a bent first limit plate rested on the second end of the respective torsion spring and has an edge formed with a bent second limit plate rested on the second end of each of the torsion springs, so that the torsion springs form a double limit effect on the press block.

* * * * *